United States Patent [19]

Walton

[11] 4,354,214
[45] Oct. 12, 1982

[54] MOTOR PROTECTION CIRCUIT

[76] Inventor: John F. Walton, 6853 Strata St., McLean, Va. 22101

[21] Appl. No.: 74,516

[22] Filed: Sep. 11, 1979

[51] Int. Cl.³ ............................................ H02H 7/08
[52] U.S. Cl. ....................................... 361/23; 361/92
[58] Field of Search ....................... 361/23, 28, 29, 33, 361/76, 77, 90, 92

[56] References Cited

U.S. PATENT DOCUMENTS

| | | | |
|---|---|---|---|
| 2,724,782 | 11/1955 | Holloway | 361/76 X |
| 3,317,741 | 5/1967 | McClain | 361/23 X |
| 3,636,541 | 1/1972 | Genuit et al. | 361/92 X |

FOREIGN PATENT DOCUMENTS 515341 12/1939 United Kingdom .
555328 8/1943 United Kingdom .
593066 10/1947 United Kingdom .

Primary Examiner—Harry E. Moose, Jr.
Attorney, Agent, or Firm—Howard L. Rose

[57] ABSTRACT

A protection circuit for multi-phase motors provides circuits for protecting a motor against low voltage, phase reversal or loss of a phase and other improper operating conditions on both the line side and the motor side of the main motor contactors. The line and motor side circuits are interrelated such that an unsafe condition on either side of the contactors causes the contactors to be opened. A time delay circuit on the motor side of the contactors prevents interruption of the holding circuit until conditions on the motor side of the contacts have been established and sensed for operation, proper or otherwise, during motor start up.

16 Claims, 1 Drawing Figure

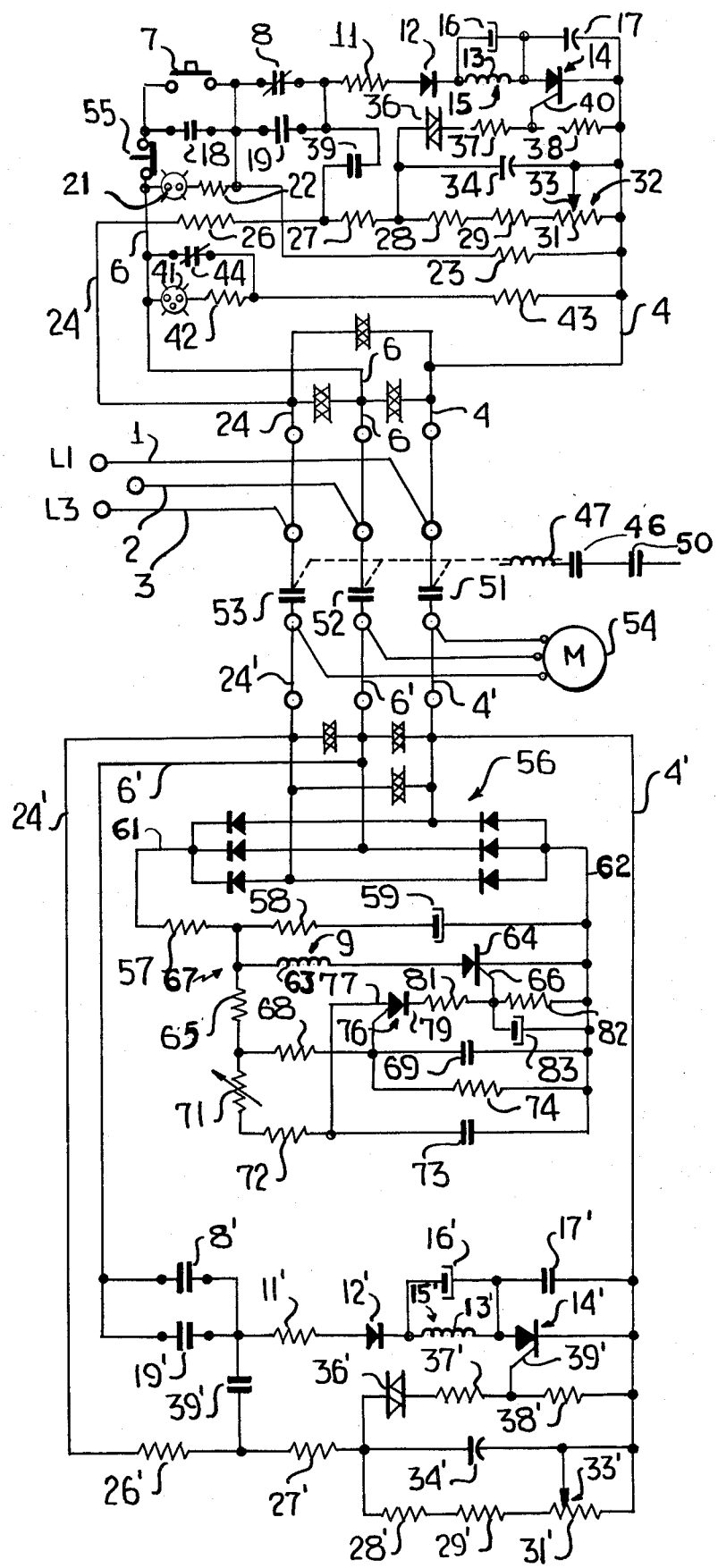

MOTOR PROTECTION CIRCUIT

BACKGROUND OF THE INVENTION

The present invention relates to motor protection circuits and more particularly to a motor protection circuit for sensing conditions on both the line side and the motor side of the main motor contactors of the circuit.

Available motor protection circuits detect various fault conditions in multi-phase circuits such as low voltage, over voltage, phase shift or reversal, loss of a phase, ground faults and related problems. Upon detection of any one or more of the aforesaid conditions, the protection circuit opens the motor contactors to protect the motor from a faulty line condition or protect the line from a faulty motor.

In such circuits known to the prior art, sensing is wholly on the line side of the motor contactors so that actual conditions at the motor are often not detected or detected only after a destructive failure. Failures such as a broken wire between the motor side of a contactor and the motor cannot be detected until operation of the motor on two phases (or one phase in a two phase system) has damaged the motor. A similar result can occur from a broken or burned out contactor. A low voltage condition can also exist from a partly burned contactor or damaged lead or bus.

As indicated, the prior art fails to provide sensing on the motor side of the motor contactors; the dangers of such failure not being recognized.

BRIEF DESCRIPTION OF INVENTION

The motor protection circuit of the present invention may be employed solely as a protection circuit having a reset capability or as such a circuit combined with a motor start-stop function.

In both arrangements, the motor contactors are connected usually in a multiphase main supply circuit and the line side of the motor protection circuit senses conditions on this main circuit.

If the circuit is employed as a reset only, a reset switch in the protection circuit is operated and a motor contactor closing circuit is primed so that upon operation of a main motor controller the contactors are closed and the motor energized.

Where the protection circuit is also employed as a start-stop control, the aforesaid reset switch becomes the start switch and has associated therewith a stop switch.

In the former circuit, the reset switch is, for instance, a push button switch which closes its associated contacts only when depressed. Closure of such contacts enables the contactor control circuit to be completed if all parameters sensed by the protection circuit on the line side of the contactors are proper. A provisional hold circuit around the reset switch is established if all parameters to be sensed on the line side of contactor are normal. The hold circuit has an additional section which includes contacts operated by the sensing circuits on the motor side of the contactors. When the motor contactors are closed, the additional section of the hold circuit will maintain the circuit if all parameters to be sensed on the motor side of the contactors are normal. An abnormality on either side of the contactors causes one or the other or both of the hold circuits to be opened; resulting in opening of the contactors.

The additional section of the hold circuit includes the normally closed contacts of a time delay relay in series with the reset switch and a protective function relay located in the line side of the protection circuit. Energization of the protective function relay establishes a by-pass circuit around the reset switch and primes the contactor closing circuit. Closure of the contactors by the motor start circuit causes a motor side or second protective function relay to close its contacts, if all parameters are proper, in shunt with the time delay relay contacts. These latter contacts are opened at a predetermined time after contactor closure regardless of the condition of the motor side circuit; the time delay relay being operated with power derived from the motor side of the contactors. The time delay relay contacts in the holding circuit are required to permit closure of the contactors without any information from the motor side of the contactors, and the time delay interval must be such as to permit conditions to be established and sensed on the motor side and for the second protective function relay to be actuated before being removed from the holding circuit.

It is an object of the present invention to provide a motor protection circuit for a motor in which abnormal conditions of supply power on the line and motor sides of the motor contactors are sensed.

It is another object of the present invention to provide line and motor side parameter sensing circuits having interrelated contactor controls for permitting initiation of the system and establishment of holding conditions.

DETAILED DESCRIPTION OF THE INVENTION

Referring specifically to the single FIGURE of the accompanying drawing, a three phase voltage is supplied on leads 1, 2 and 3. The voltage on lead 1, hereinafter the phase 1 voltage, is applied to a lead 4, while the voltage on lead 2, hereinafter phase 2 voltage, is applied to a lead 6.

A holding circuit is connected between leads 4 and 6 and includes in series a push button reset switch 7, normally closed contacts 8 of time delay relay 9, resistor 11, diode 12, coil 13 of a first protective function relay 15 and a silicon controlled rectifier 14. The coil 13 is shunted by a storage and time delay capacitor 16 and the rectifier 14 is shunted by a by-pass capacitor 17. The relay 15 includes contacts 18, 44 and 46.

The switch 7 is shunted by normally open contacts 18 of the relay 15 while the contacts 8 are shunted by normally open contacts 19 of the relay 9.

The contacts 18 are also connected in shunt with a bulb 21 and resistor 22 connected in series with a further resistor 23 between leads 4 and 6.

The lead 3 carries the phase 3 which is applied to a lead 24. Five resistors 26, 27, 28, 29 and 31 are connected in series between leads 4 and 24; the resistor 31 constituting the resistive element of a potentiometer 32 having a slide arm 33 connected to the lead 4 to permit shorting of a variable section of the resistor 31. A capacitor 34 is connected in shunt with resistors 28, 29 and 31 and the junction of resistors 27 and 28 is via a series circuit comprising diac 36 and resistors 37 and 38 to lead 4. The junction of resistors 37 and 38 is connected to control electrode 40 of silicon controlled rectifier 14. The junction of resistors 26 and 27 is connected via a capacitor 39 to the junction of resistor 11 and contacts 8 and 19 respectively of relays 9 and 15'.

To complete the line side circuit, a bulb 41 is connected in series with resistors 42 and 43 between leads 6 and 4 and a second set of normally closed contacts 44 of protective function relay 15 is connected in shunt with bulb 41 and resistor 42.

To commence operation, the reset switch 7 is depressed and if the SCR 14 is conductive, the relay 15 is energized. The conditions necessary to render the SCR conductive are that a low voltage condition does not exist, that no phase is absent and the phases of the voltages are proper.

Specifically, the SCR 14 is fired with the voltage across capacitor 34 is charged to a specific value, 8 volts for instance, at which time the diac 36 becomes conductive. The capacitor 34 discharges through resistors 37 and 38 and causes the SCR to conduct. Two conditions must be met: the capacitor 34 must reach a proper charge and at the proper time. If a low voltage condition exists, the diac may not fire due to the capacitor 34 not charging to 8 volts or it may fire at a time that the voltage across the SCR 14 is reversing.

In order for the capacitor 34 to charge to proper voltage, minimum acceptable line voltage must be achieved on all three phases. The capacitor 39 and resistor 26 are utilized as a phase shift circuit so that the voltage of phase 2, lead 6, is added to the voltage difference between the phase voltages on leads 4 and 24. If the phase of all three of the voltages is correct and present and the voltages are above a minimum level determined by the set point established by potentiometer 32, the capacitor 34 becomes charged to the appropriate firing voltage of diac 36 at the proper time to fire the SCR 14.

Firing of the SCR 14 causes the relay 15 to be energized and it closes its contacts 18, shunting the reset switch 7 and shorting the bulb 21, a red bulb indicating that the circuit is not in operation. The capacitor 16 (50 μf) holds the coil 13 energized for a predetermined time period assuring closing of its contacts and holding such contacts closed during each half cycle of the A. C. when the SCR 14 is non-conductive. Concurrently, the relay 15 opens its contacts 44 to remove a short around bulb 41, a green bulb, indicating when illuminated, that the circuit is in operation.

The reset button 7 may now be released; the circuit being maintained through contacts 18 and the time delay relay contact 8. The time delay relay 9 is utilized to open its contacts after a length of time required for the motor side of the system to settle down to operating conditions after start-up.

Relay 15 also closes a set of contacts 46 connected in series with a coil 47 of contactor closer 48 which when energized, closes contacts 51, 52 and 53 connected to leads 4, 6 and 24, respectively; whereby energy is supplied to motor 54 and the circuits on the motor side of the contactor.

If the protector circuit is incorporated in a reset circuit only, a set of contacts 50 are included in the circuit of coil 47 so that the system may be placed in operation or removed by opening or closing contacts 50. If the protection circuit is incorporated in the motor start-up circuit, then the contact 50 is not required but a "stop" contact 55 must be included in the protection circuit, in lead 6 for instance.

Referring now to the circuits on the motor side of the contactor, the parts on the motor side corresponding with parts on the line side bear the same reference numerals but with primes.

The time delay circuit comprises a three phase rectifier circuit, generally designated by reference numeral 56, having connected across its output, a smoothing filter comprising resistors 57 and 58 connected in series with filter capacitor 59 to provide a DC voltage across leads 61 and 62.

Coil 63 of relay 9 is connected in series with SCR 64 across leads 61 and 62 so that when proper voltage is applied to trigger electrode 66 of SCR 64, the relay 9 is energized and opens its contacts 8 in series with start switch 7.

A time delay circuit 67 is provided in order to delay opening of contacts 8 for the stated reason. It will be noted that contacts 8 of the delay circuit 67 and contacts 19 of a protective function relay 15' of the motor side fault detection circuit are in parallel. The holding circuit can be maintained if contacts 8 are not opened or if opened, the contacts 19 are closed before contacts 8 open. Further, if a fault in the motor side of the circuit only is detected, the system can be shut down only if the contacts 8 have been opened. Thus, the contacts 8 must be opened even if a low voltage condition exists and also in the presence of loss of a phase. If two phases are lost, the motor won't operate so no damage is done.

The time delay circuit has lead 61 connected through resistors 65 and 68 and capacitor 69 to lead 62. The junction of resistors 65 and 68 is connected through a variable (set point) resistor 71, fixed resistor 72 and capacitor 73 to lead 62 and the junction of resistor 68 and capacitor 69 is connected through resistor 74 to lead 62.

A programmable unijunction transistor 76 has its collector 77 connected to the junction of resistor 72 and capacitor 73, its programmable control elecrode 78 connected to the junction of resistor 68 and by-pass capacitor 69 and its base 79 connected via series resistors 81 and 82 to lead 62. Resistor 82 is shunted by capacitor 83 for noise suppression.

The unijunction transistor 76 is employed to permit selection of an operating voltage on the control which may be tailored to the circuit rather than being a fixed value that is inherent in the device. The unijunction transistor 76 and diac 36 are employed in the first instance to provide appropriate timing circuits since SCR's are notably very low input impedance devices which do not readily lend themselves to use in timing circuits without these auxiliary devices. The resistors 71 and 72 and capacitor 73 provide a basic time delay which may be set by variable resistor 71 within desired limits. The transistor 76 has a low firing threshold so that it will conduct in spite of a low voltage condition such as might result from loss of a phase or low line voltage conditions.

Conduction of the transistor 76 fires the SCR 64 which has a noise filter 82-83 on its trigger to prevent false and premature triggering in the presence of intense electrical noise problems. Firing of SCR 64 energizes relay 9 which opens its contacts 8. If contacts 19 have not closed the contactors 51-53 are opened indicating a motor side problem. If contacts 19 are closed the system is operating properly and continues energized.

Contacts 19 are controlled by relay 15' of the motor side protective circuit. This latter circuit is identical with the corresponding line side circuit except for elimination of start switch 7 and its by-pass contacts 18.

A typical circuit is as follows:

| RESISTORS | |
| --- | --- |
| 11 - 5,000 ohms | 57 - 22,000 ohms |
| 23 - 47,000 ohms | 58 - 47 ohms |
| 26 & 27 - 82,000 ohms | 67 - 470,000 ohms |
| 28 - 2,200 ohms | 68 - 39,000 ohms |
| 29 - 470 ohms | 71 - variable |
| 31 - 1,000 ohms | 72 - 200,000 ohms |
| 37 - 22 ohms | 74 - 200,000 ohms |
| 38 - 1,000 ohms | 81 - 22 ohms |
| 43 - 47,000 ohms | 82 - 1,000 ohms |

| CAPACITORS |
| --- |
| 16 - 50 μf |
| 17 - .01 μf |
| 34 - .50 μf |
| 39 - .033 μf |
| 59 - 2 μf |
| 69 - .05 μf |
| 73 - .33 μf |
| 83 - 1.0 μf |

| SILICON CONTROLLER RECTIFIERS |
| --- |
| 14 & 64 - C106D1 |

| UNIJUNCTION TRANSISTOR |
| --- |
| 76 - 2N6027 |

| DIAC |
| --- |
| 36 - 2N4991 |

The illustrated apparatus may readily be employed in partwinding and star delta starting systems. One, two, or three timers and two voltage-phase detection circuits may be required on the motor side of the contactors with one timer having a greater delay than the others to provide for pro-detection of an incomplete transition to final operating circuit connection.

The circuit may readily be employed on two-phase systems with no charge in philosophy and little charge in circuits. The phase shift circuit would have to be modified to provide for a 90° instead of 120° shift.

The under voltage circuit may readily be employed as an over voltage circuit by changing the timing so that over voltage prevents firing of the SCR. Series connected SCR's can provide both over and under voltage protection. The general arrangement may incorporate a two phase, three phase or multiphase voltage unbalance detector which can interrupt the main holding circuit if unbalance exceeds a predetermined level. In a similar manner, a two, three, or multiphase load current unbalance detector may be incorporated into the motector.

It should be noted, that any number of functions may be added to the circuit by adding appropriate sensing circuits for controlling additional SCR's. If the SCR's are connected in separate circuits rather than in series or in parallel with one another, the contacts of the protective relays in the motor side of the system would all be connected in series with each other with the time delay relay contact 8 in parallel with such series circuit.

While I have described and illustrated one specific embodiment of my invention, it will be clear that variations of the details of construction which are specifically illustrated and described may be resorted to without departing from the true spirit and scope of the invention as defined in the appended claims.

I claim:

1. Apparatus for protecting an electrical motor connectable to an electric power source through a switchable circuit breaker means comprising:
    a first protection circuit having first protection means for sensing a first plurality of elecrical parameters at the power source detrimental to the motor and first operation means for causing the circuit breaker to switch to an open condition disconnecting the motor from the power source,
    said first operation means being actuatable upon the sensing by the first detection circuit of a malfunction of any one of said first plurality of electrical parameters, and
    a second protection circuit comprising second detection means for sensing a second plurality of parameters on the side of the circuit breaker connected to the motor detrimental to the motor,
    second operation means for causing the circuit breaker to switch to an open condition and disconnect the motor from the power source,
    said second operation means being actuatable upon the sensing by said second detection circuit of any one of said detrimental second plurality of electrical parameters.

2. The apparatus of claim 1 wherein said first and second plurality of parameters are the same.

3. The apparatus of claim 1 wherein said second operation means is operatively connected to said first operation means with said first operation means being actuatable by said second operation means.

4. The apparatus of claim 1, wherein the switchable circuit breaker means comprises at least one pair of electrical contacts and means for moving the electrical contacts between an open circuit and a closed circuit condition.

5. The apparatus according to claim 1 further comprising a time delay circuit,
    and means for delaying the effect of said second operations means on opening said circuit breaker for a predetermined period.

6. The apparatus of claim 1, wherein the electrical power source comprises a polyphase AC power source and the electrical motor is a polyphase motor.

7. Apparatus of claim 1 wherein the load may be a single or polyphase load, whether reactive or resistive, requiring some or all of the protection afforded by the apparatus 8. A method for protecting an electrical motor connected to the electrical power source through a switchable circuit breaker means for disconnecting the electric motor from the power source comprising the steps of providing of a first and second protection means, and connecting the first protection means to sense electrical parameters between the power source and the circuit breaker means detrimental to the motor and the second protection means to sense electrical parameters between the circuit breaker means and the electrical motor detrimental to the motor.

9. An apparatus for protecting an electrical motor operatively connectable to an electrical power line having more than two leads through a switchable circuit breaker means comprising:
    a first protection circuit having a first detection means for sensing electrical parameters in the connection between the circuit breaker means and the motor, and
    operations means for causing the circuit breaker to open the connection between the electrical power source and the motor,
    said operation means being actuatable upon the sensing by said first detection means of electrical parameters detrimental to the motor,
    said detection means being powered from more than two leads of the power source and comprising means for sensing and opening said breaker means upon substantial reduction of voltage on one of said power supply leads.

10. The apparatus of claim 9, wherein the apparatus further comprises a second protection circuit having second detection means for sensing electrical parmeters at the power source detrimental to the electric motor and second operation means for causing said circuit breaker to switch to an open condition disconnecting the motor from the power source, said second operation means being actuatable upon the sensing by the said second detection means of the electrical parameters detrimental to the motor, first operation means being operably connected to said circuit breaker means through said second protection circuit and causing said circuit breaker means to disconnect the motor from the power source through actuation of said operation means.

11. A protection circuit for a multi-phase motor adapted to be connected to electrical leads having multiple phases thereacross comprising first means for sensing an abnormal electrical parameter on said electrical leads, a plurality of leads, a multi-phase circuit breaker for selectively connecting said plurality of leads to said electrical leads, second means for sensing low voltage concurrently on all of said first and/or second plurality of leads, first control means for selectively initiating actuation of said circuit breaker to interconnect said leads and said electrical leads, said first control means including means for preventing actuation of said circuit breaker upon said first means detecting said abnormal electrical parameter on said electrical leads, and second control means for deactivating said circuit breaker upon detection of low voltage on all phases of said leads.

12. A protection circuit for a multi-phase motor adapted to be connected to electrical leads having multiple phases thereacross comprising first means for sensing an abnormal electrical parameter on said electrical leads, a plurality of leads, a multi-phase circuit breaker for selectively connecting said plurality of leads to said electrical leads, second means for sensing reversal of phase of the voltage on one of said plurality of leads, first control means for selectively initiating actuation of said circuit breaker to interconnect said leads and said second leads, said first control means including means for preventing actuation of said circuit breaker upon said first means detecting said abnormal electrical parameter on said electrical leads, and second control means for deactivating said circuit breaker upon detection of a reversal of phase on one of said plurality of leads.

13. A protection circuit for a multi-phase motor comprising first means for sensing low voltage on all phases of first voltage supply leads, second means for sensing low voltage on all phases of second voltage supply leads, a multi-phase circuit breaker, said second voltage supply leads being connected to a multi-phase motor and selectively through said circuit breaker to the first voltage supply leads, control means for selectively initiating actuation of said circuit breaker to connect said second voltage supply leads to said first voltage supply leads, said control means including means for preventing actuation of said circuit breaker upon said first means sensing low voltage on all phases of said first voltage supply leads, and means for deactivating said circuit breaker upon detection of low voltage on all phases of said first and/or second voltage supply leads.

14. The apparatus according to claim 13 wherein said control means comprises a restart means, switch means for actuating a circuit breaker, means responsive to means to activate said circuit breaker, means responsive to detection of normal voltages on all said leads by said first and second means for sensing to establish a holding circuit around said restart means, and delay means responsive to voltage on said second leads for disabling said restart means after establishment of said holding circuit.

15. The apparatus according to claim 13 or 14 wherein said means for sensing senses low voltage on each voltage phase, reversal of phase of any of the voltages and loss of balance between phases.

16. The apparatus according to claim 15 wherein said delay means is operative in the presence of low voltage as well as normal voltage, and loss of a phase voltage.

* * * * *